United States Patent [19]

Imura et al.

[11] 3,999,194
[45] Dec. 21, 1976

[54] STRUCTURE FOR MOUNTING COMPONENTS FOR SINGLE LENS REFLEX CAMERAS

[75] Inventors: Toshinori Imura, Sakai; Mitsuru Saito, Kaizuka; Kunio Kawamura, Sakai, all of Japan

[73] Assignee: Minolta Camera Kabushiki Kaisha, Osaka, Japan

[22] Filed: Mar. 10, 1975

[21] Appl. No.: 557,221

[30] Foreign Application Priority Data

Mar. 14, 1974 Japan .............................. 49-28538

[52] U.S. Cl. ............................... 354/60 R; 354/50; 354/152
[51] Int. Cl.² ...................... G03B 7/00; G03B 19/12
[58] Field of Search ............. 354/51, 31, 155, 224, 354/225, 60, 152, 219, 29, 43, 50, 22

[56] References Cited

UNITED STATES PATENTS

| 3,603,200 | 9/1971 | Heriema ............................ 354/225 |
| 3,732,775 | 5/1973 | Warstal ........................ 354/225 X |
| 3,812,499 | 5/1974 | Hayashi et al. .................. 354/51 X |
| 3,846,805 | 11/1974 | Kiyohara et al. .............. 354/219 X |
| 3,866,240 | 2/1975 | Tsujimoto ...................... 354/152 X |

Primary Examiner—Edna M. O'Connor
Attorney, Agent, or Firm—Watson, Cole, Grindle & Watson

[57] ABSTRACT

A pentagonal prism holder retains a pentagonal prism in a given position above a focusing glass plate in a single lens reflex camera. A printed base plate holder having a light-receptive element-holding portion, in which at least a single light-receptive element is mounted, supports a printed base plate, on which are disposed electric elements constituting at least part of an electronic shutter controlling circuit. The printed base plate holder is removably mounted on the pentagonal prism holder, such that the light-receptive elements abut respective small prisms which are fixedly mounted on the roof of the pentagonal prism, whereby the light-receptive elements may receive part of the light images from the pentagonal prism.

8 Claims, 6 Drawing Figures

STRUCTURE FOR MOUNTING COMPONENTS FOR SINGLE LENS REFLEX CAMERAS

BACKGROUND OF THE INVENTION

This invention relates to single lens reflex cameras, wherein light-receptive elements receive a portion of the light images from a pentagonal prism, and part of an exposure controlling circuit is mounted above the pentagonal prism.

It is known in single lens reflex cameras that, to receive light rays coming through an objective lens from an object for light measurement, one or two small prisms are bonded to the roof surfaces of a pentagonal prism, and light-receptive elements are fixedly mounted on the respective small prisms by using rings or the like, so that a portion of the image light rays focused on a focusing glass plate may be introduced into the light-receptive elements, and thus light measurement is effected while observing the image.

Such a method for attaching the light-receptive elements to the pentagonal prism, however, causes difficulty in positioning the light-receptive elements exactly on the small prisms. Furthermore, it has been almost impossible to place the light-receptive elements on the pentagonal prism so that they are removable. Moreover, the use of an electronic shutter requires an increase in the space occupied by the exposure controlling circuit relative to the camera casing. For this reason, the exposure controlling circuit has been housed both in the camera casing and in the finder casing.

SUMMARY OF THE INVENTION

The present invention provides a pentagonal prism device for use in a single lens reflex camera, which comprises a pentagonal prism holder for retaining a pentagonal prism in a given position above a focusing glass plate of the camera. A printed base plate holder is removably mounted on the pentagonal prism holder, and has light-receptive element-holding portions and supports a printed base plate on which are printed electrical elements constituting at least part of an electronic shutter controlling circuit. The light-receptive element-holding portions retain therein light-receptive elements in abutting relation to small prisms, which are fixedly mounted on the roof of the pentagonal prism retained within the pentagonal prism holder. With the printed base plate holder mounted on the pentagonal prism holder, the light-receptive elements retained in the holding portions of the printed base plate holder receive part of the light images from the pentagonal prism.

OBJECTS OF THE INVENTION

It is accordingly an object of the present invention to provide a single lens reflex camera, wherein the light-receptive elements receiving a portion of the light images are readily and removably placed on a pentagonal prism.

Another object of the present invention is to provide a single lens reflex camera, wherein the light-receptive elements which receive part of the light images are removably mounted on a pentagonal prism, thereby facilitating cleaning of the pentagonal prism as well as cleaning of the light receiving surfaces of the light-receptive elements.

A further object of the present invention is to provide a single lens reflex camera, wherein the light-receptive elements for receiving part of the light images are readily mounted on a pentagonal prism, and at least part of an exposure controlling circuit is compactly housed in the finder casing.

A still further object of the present invention is to provide a single lens reflex camera, wherein a finder cover is removably mounted over the finder chamber so as to facilitate the removal of a pentagonal prism and part of an exposure controlling circuit which is disposed above the pentagonal prism.

These and other objects and features of the present invention will be apparent from a reading of the ensuing specification in conjunction with the drawings which indicate a preferred embodiment of the invention.

DETAILED DESCRIPTION OF THE INVENTION

Figure 1:
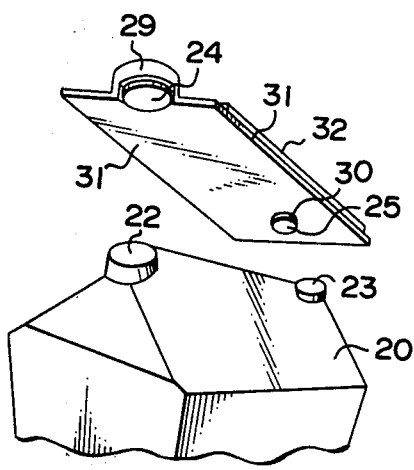
FIG. 1 is a perspective view illustrating a preferred embodiment of a pentagonal prism and a printed base plate holder.
Figure 4:
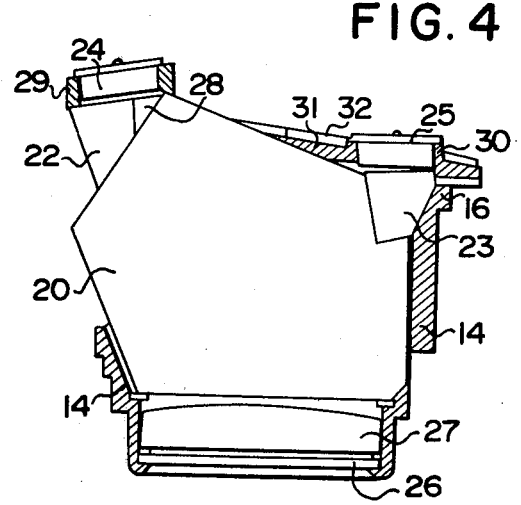
FIG. 4 is a side view showing the relationship between the pentagonal prism and the printed base plate.
Figure 6:
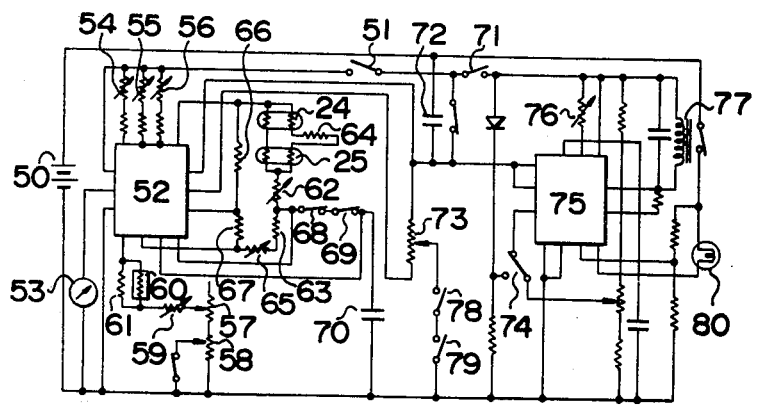
FIG. 6 is a diagram of an exposure time controlling circuit.

FIG. 1 is a perspective view showing the basic relationship between a printed base plate holder and a pentagonal prism. Printed base plate holder 31 supports on one surface thereof printed base plate 32, on which are disposed electrical elements constituting an exposure time controlling circuit, as shown in FIG. 6. Printed base plate holder 31 has holding ring 29 in which light-receptive element 24 is fixedly mounted, and is provided with hole 30 in which another light-receptive element 25 is mounted. Pentagonal prism 20 is retained by pentagonal prism holder 14, as best seen in FIG. 4. With printed base plate holder 31 placed on the roof of pentagonal prism 20, light-receptive elements 24 and 25 are respectively positioned on small prisms 22 and 23 which are fixedly mounted on the roof of pentagonal prism 20 and adapted to transmit part of the light images from the pentagonal prism.

Figure 2:
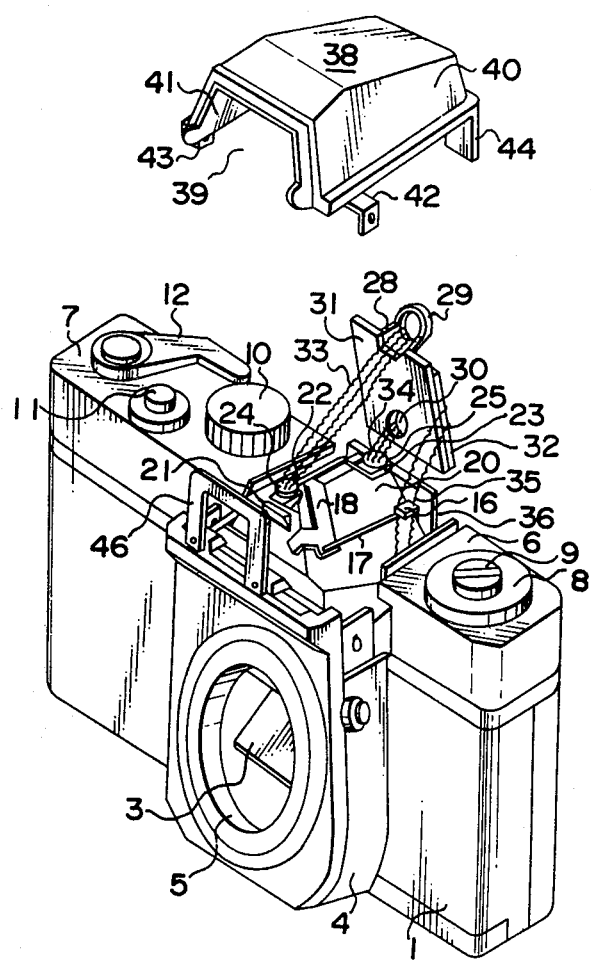
FIG. 2 is a perspective view showing the camera casing and the finder cover with the light-receptive elements removed from the printed base plate holder.
Figure 5:
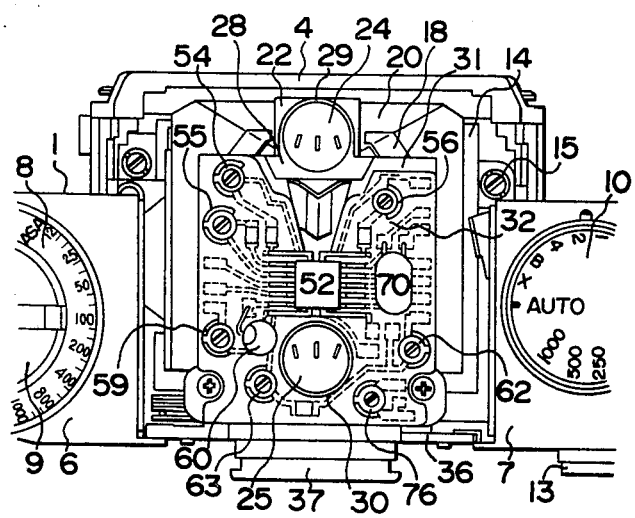
FIG. 5 is a top plan view of the camera with the finder cover removed.

Referring to FIG. 2, mirror box 2 (FIG. 3) is rigidly mounted substantially in the central part of body proper 1 of the camera, for supporting movable mirror 3. In front of mirror box 2 is disposed front plate 4 having lens mount 5. Film sensitivity selecting dial 8 is rigidly mounted on a film sensitivity selecting shaft which projects through one top cover 6 of body 1 of the camera. Film feed-back shaft 9 loosely projects through the film sensitivity selecting shaft and film sensitivity selecting dial 8. Respectively rigidly mounted on a shutter speed setting shaft, a release shaft and a film winding shaft, all of which project through another top cover 7 of the body 1 of the camera, are shutter speed setting dial 10, release buttton 11 and film winding lever 12. On the rear wall of top cover 7, potential source switch 13 projects (FIG. 5), which switch is connected to the exposure time controlling circuit shown in FIG. 6.

Figure 3:
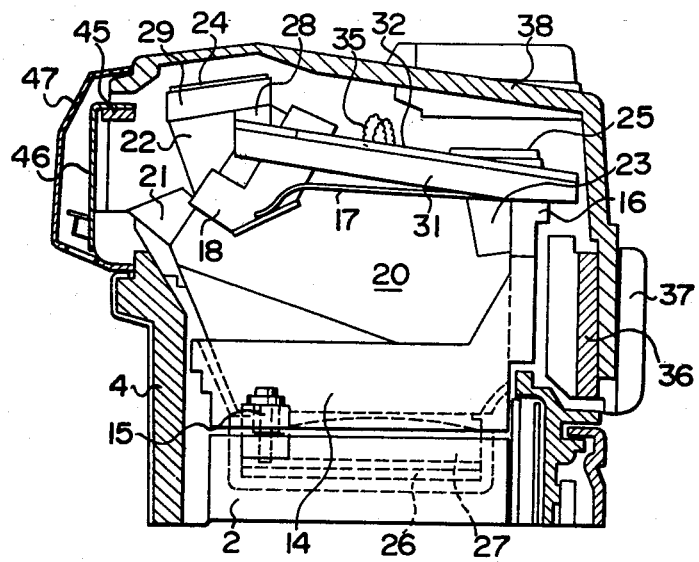
FIG. 3 is a longitudinal cross-sectional side view of FIG. 2.

Pentagonal prism holder 14, as best seen in FIG. 3, is secured by means of screw 15 to the upper portion of mirror box 2 such that the position of the pentagonal prism may be adjusted. Pentagonal prism holder 14 retains focusing glass plate 26 and condenser lens 27 in its bottom portion, as seen in FIG. 4, whereby light images from focusing glass plate 26 enter pentagonal prism 20, removably mounted on pentagonal prism holder 14. A back surface of pentagonal prism holder 14 supports the rear face of pentagonal prism 20, and is formed by a pair of angled projections 16 extending on the top left and right sides thereof. A pair of pentaprism holding springs 17 extend forwardly of the pair of angled projections 16, thereby retaining pentagonal prism 20 on the front portion of the roof surfaces thereof, with the aid of holder pieces 18.

Attached to the front upper face of pentagonal prism 20 is prism 21 which introduces light into the finder in accordance with the diaphragm setting graduations provided on a lens barrel of the camera. Two small prisms 22 and 23 are attached onto the front and rear roof portions of prism 20 for transmitting part of the light images from focusing glass plate 26. Gate-shaped holding member 46 is mounted on the upper portion of front plate 4 in confronting relationship to prism 21, and gate-shaped holding member 46 has reflecting mirror 45, on which the light from the diaphragm setting graduations is reflected.

Printed base plate holder 31 is removably mounted, for instance, by screws at several places, on angled projections 16 provided on the top of the rear wall of pentagonal prism holder 14, such that light-receptive element 24 retained by retaining ring 29 is positioned on the light emitting surface of small prism 22. Light-receptive element 25, mounted in hole 30, is positioned on the light emitting surface of small prism 23. Thus, the light rays of an image formed on focusing glass plate 26 enter through condenser lens 27 in the bottom face of pentagonal prism 20 mounted on pentagonal prism holder 14. Then part of the light images thus entering the prism are introduced, by small prisms 22 and 23, into light-receptive elements 24 and 25. Angled member 28 is bent along the rear face of small prism 22 to support retaining ring 29.

On the upper surface of printed base plate holder 31 is fixedly mounted printed base plate 32, on which is printed an electronic shutter controlling circuit having adjustable resistors, which circuit is described with reference to FIG. 6. Printed base plate 32 is connected by conductor 35 to potential source 50, ammeter 53 and exposure controlling electromagnet 77, (FIG. 6) which are disposed in the camera body. In the embodiment of FIG. 2, light-receptive elements 24 and 25 are arranged so as to be removably fitted in retaining ring 29 and hole 30, respectively, rather than permanently mounted therein, and for purposes of the description, the device is shown, with light-receptive elements 24 and 25 placed on respective small prisms 22 and 23, and connected to the printed base plate 32 by extendible connecting wires 33 and 34. Eye piece frame 36, on which is mounted eye piece 37, is screwed to the rear portion of the camera body.

With respect to FIG. 2, finder cover 38, which is made of an opaque material such as opaque plastic, is box-shaped and suited for entirely covering pentagonal prism 20 and printed base plate holder 31 mounted on angled projections 16. Box-shaped finder cover 38 has front opening 39, opposite side plates 40 and 41 adapted to be fitted in the camera body along the centrally positioned side walls of respective top covers 6 and 7, and supports 42 and 43 projecting downwardly from the respective camera side plates. By screwing supporting legs 42 and 43 to mirror box 2, finder cover 38 is removably mounted thereon. The rear wall of finder cover 38 has downwardly extending projections 44 which receive eye piece 37 therebetween. Downwardly extending projections 44 are brought into contact with the rear face of eye piece retaining frame 36 with finder cover 38 mounted over the camera.

With reference to FIG. 3, front cover 47 is mounted over finder cover 38 and front plate 4 to cover front opening 39 of the finder cover. Front cover 47 is built to interlock with the front end of finder cover 38 and front plate 4 on the side of the camera body. Front cover 47 is mounted to finder cover 38 and front plate 4 by well-known means, such as pins, and is constructed to be freely removable from finder cover 38. Thus, a finder chamber is defined by front cover 47, finder cover 38 and ocular lens-retaining frame 36, on which downwardly extending projection 44 overlaps.

FIG. 6 shows an embodiment of an electronic shutter circuit which is printed on printed base plate 32. The electronic shutter circuit is connected to potential source 50 through the actuation of switch 51, adapted to be closed or opened by main switch 13. Adjustable, variable resistors 54, 55 and 56 are connected between switch 51 and light measuring integrated circuit 52, to which is input current produced in light-receptive elements 24 and 25. The output from light measuring integrated circuit 52 operates meter 53 which indicates the shutter speed to be controlled. An adjustable, variable resistor 59 and variable resistors 57 and 58, which are connected in series to one another, are connected by fixed resistor 61 and thermistor 60 (connected in parallel to each other) to the light measuring integrated circuit for biasing the same. Variable resistor 57 varies its resistance in interlocking relationship to film sensitivity selecting dial 8, and the resistance of variable resistor 58 is varied in association with the operation of a known diaphragm adjusting ring for an exchange lens (not shown). Thus, meter 53 indicates the shutter speed corresponding to the brightness of the object, film sensitivity and the pre-set diaphragm value.

The output from light measuring integrated circuit 52, which operates meter 53, is connected to storing capacitor 70 via switches 68 and 69, which are connected in series to each other. When one of switches 68 and 69 is opened, the output produced at that time from light measuring integrated circuit 52 is stored in storing capacitor 70. When resistors 64, 63, 66, 67 and adjustable, variable resistors 62, 65 are set to suitable resistance values, the output voltage from light measuring integrated circuit 52 is stored in storing capacitor 70 as a voltage obtained by logarithmically converting the brightness of the object, film sensitivity and adjusted diaphragm value, as is known to those skilled in the art.

Switch 71 is adapted to excite electromagnet 77, in association with the releasing operation, for instance through the rotation of movable mirror 3 from its viewing position to its picture-taking position, as well as to actuate a timing circuit, which consists of resistor 73 and trigger switch 78 (closed in association with the operation of delay capacitor 72 and the shutter release); and an auxiliary trigger switch 79 connected in series with trigger switch 78. Switching integrated circuit 75 is connected via switch 71 and adjustable variable resistor 76 to potential source 50, and is actuated to cut-off the electric current to electromagnet 77, when the photoconductive voltage in delay capacitor 72 of the timing circuit reaches a given level, thereby closing the shutter circuit. Change-over switch 74 is interconnected with shutter speed dial 10 and changed over between the automatic control of shutter speed, according to the voltage stored in storing capacitor 70, and the manual setting of the shutter speed. Lamp 80 indicates the application of the voltage of potential source 50.

Adjustable, variable resistors 54, 55, 56, 59, 62, 65 and 76 require adjustment when the electronic shutter circuit is incorporated in the camera, as well as a further adjustment, as the case may be, after the incorporation thereof in the camera. These adjustable, variable resistors, in the present invention, are disposed on printed base plate 32, such that adjustment of these variable resistors may be facilitated by only removing finder cover 38 from the camera body.

Having described our invention as related to the embodiment shown in the accompanying drawings, it is our intention that the invention not be limited by any of the details of the description, unless otherwise specified, but rather be construed broadly within its spirit and scope as determined by the accompanying claims.

What is claimed is:

1. Apparatus for a single lens reflex camera, comprising:
    a focussing glass plate for focussing reflected light from an object into an image;
    a first prism for transmitting at least a portion of said image; at least one second prism smaller than said first prism mounted thereon and including a light emitting surface;
    a prism holder for retaining said first prism;
    a plate holder removably supported on said prism holder; a plate disposed on said plate holder; a circuit provided on said plate and including at least part of an exposure controlling electric circuit, and at least one light-receptive element disposed on said plate and having a light receiving surface confronting a predetermined part of said light emitting surface with said plate holder supported on said prism holder.

2. Apparatus as in claim 1, further comprising an independent finder cover for covering at least said first prism and said plate holder.

3. Apparatus as in claim 2, wherein said finder cover includes a front opening and a front cover for closing said front opening is removably mounted on said finder cover.

4. Apparatus as in claim 3, wherein said finder cover further includes a cut portion on the wall thereof facing away from said front opening for receiving an eyepiece barrel.

5. Apparatus as in claim 1, wherein said prism holder further includes angled projections for supporting said plate holder, and spring members extending from said angled projections for retaining the roof surface of said first prism mounted on said prism holder.

6. Apparatus as in claim 1, wherein said prism holder further includes a prism bearing surface and another bearing surface for said focusing glass plate disposed below said first prism.

7. Apparatus as in claim 1, further comprising a shutter to control exposure, a power source and control means for terminating exposure by said shutter; and said plate including an exposure time control circuit printed thereon, said circuit including adjustable resistors connectable to said power source, an integrated light measuring circuit, an integrated timing circuit, an integrated switching circuit, and the output from said switching circuit being connected to said means for terminating exposure.

8. Apparatus as in claim 7, wherein said plate further includes a print circuit storage means printed thereon and connectable to said light measuring circuit and said timing circuit.

* * * * *